United States Patent Office 3,591,391
Patented July 6, 1971

3,591,391
COMPOUND SEASONING
Shukuo Kinoshita and Iwao Matsuda, Tokyo, and Akio Shiga and Hideyuki Furukawa, Machida-shi, Japan, assignors to Kyowa Hakko Kogyo Co., Ltd., Tokyo, Japan
No Drawing. Filed May 27, 1964, Ser. No. 370,723
Claims priority, application Japan, June 7, 1963, 38/29,274
Int. Cl. A23l 1/22
U.S. Cl. 99—140
9 Claims

ABSTRACT OF THE DISCLOSURE

A seasoning made up of crystalline monosodium glutamate having incorporated in the crystals thereof a flavor enhancing minor proportion of di-sodium 5'-guanylate, di-sodium 5'-inosinate or mono-sodium aspartate.

---

This invention relates to compound seasonings and methods for preparing same. In one aspect this invention relates to compound seasonings which contain one relishing material such as mono-sodium glutamate, monosodium asparate, di-sodium 5'-inosinate, di-sodium 5'-guanylate or the like as a principal ingredient and another relishing material as a minor ingredient contained in the crystal of the above-mentioned principal ingredient, and to methods for preparing same.

Considering the relation between the composition of compound seasoning and the effectiveness thereof, it frequently happens that even the smallest amount of another secondary ingredient contained in a principal ingredient is effective for synergistic taste- and/or flavor-enhancing (relishing) effect. In this regard, the compounding of relishing material is frequently required in the art, but it is difficult to prepare a homogenous mixture by the customary mixing method on account of the condition associated with the specific gravity, shape, size, etc. of the composition. Accordingly commercialized compound seasonings are prepared by such a complicated method as coating, granulating or the like at the present time.

It is an object of this invention to provide novel compound seasonings which can be prepared by extremely simpler methods when compared with conventional compound seasonings. It is another object of this invention to provide novel methods for preparing such unique compound seasonings.

These and other objects of the invention are accomplished by the incorporation of one principal ingredient with another ingredient in a crystal of compound seasoning, in other words, by preparing a crystal of compound seasoning which contains two constituents. Accordingly the compound seasonings of the present invention are prepared by methods which are based upon an idea entirely different from conventional methods.

Practically the incorporation of the major ingredient with the minor ingredient in the crystal of the compound seasoning can be effected by increasing the super-saturation degree and crystallization velocity in the crystallization process of the principal ingredient. This increases the chance of mother liquor being taken up in the crystal of the principal ingredient. Holding up of agitation is also helpful in increasing the impurity included in the crystal.

The following specific examples illustrate the compound seasonings of the present invention and methods for preparing same but are not intended to limit the invention to the embodiment shown therein.

EXAMPLE 1

70 ml. of an aqueous solution containing 40 g. of monosodium glutamate and 0.2 g. of di-sodium 5'-guanylate was cooled down from a temperature of ca. 80° C. while conducting gentle agitation. When the solution temperature had come down to 69° C., 0.4 g. of monosodium glutamate having a mesh size of lower than 250 was added, the liquid being thus brought to the state at which crystallization started. Resulting crystal of mono-sodium glutamate contained guanylic acid as a minor ingredient. When this crystal was dissolved in water, and subjected to ultra-violet absorption spectroscopic test, it was found to have a maximum absorption in the neighborhod of 255 m$\mu$. When this crystal was observed by a polarization microscope, the existence of the minor constituent was confirmed.

EXAMPLE 2

70 ml. of an aqueous solution containing 40 g. of monosodium glutamate and 0.2 g. of di-sodium 5'-inosinate was cooled down from a temperature of ca. 80° C. while conducting gentle agitation. At a liquid temperature of 69° C., 0.4 g. of monosodium glutamate having a particle size lower than 250 mesh was added thereto, the liquid being thus brought to the state at which crystallization started. Resulting crystal was dissolved in water and subjected to ultra-violet absorption spectroscopic test, whereby it was found to have a maximum absorption in the neighborhood of 250 m$\mu$. By observing with a polarization microscope, the existence of minor ingredient was confirmed.

EXAMPLE 3

70 ml. of an aqueous solution containing 40 g. of monosodium glutamate and 40 g. of mono-sodium aspartate was cooled down from a temperature of ca. 80° C. while conducting gentle agitation. At a liquid temperature of 69° C., 0.4 g. of mono-sodium glutamate having a particle size lower than 250 mesh was added thereto and the liquid was brought to the state at which crystallization started. Resulting crystal was tested by paper chromatography by which spots of two kinds of amino acid, i.e. glutamic acid and aspartic acid were observed. This indicates that the mono-sodium asparate was included as a minor ingredient with mono-sodium glutamate.

What is claimed is:

1. A method for the preparation of a compound seasoning, which comprises cooling a supersaturated aqueous solution of, as solute, a major proportion of sodium glutamate, as major ingredient and, as minor ingredient a minor proportion of a member selected from the group consisting of sodium aspartate, sodium 5'-inosinate and sodium 5'-guanylate, from a temperature above incipient crystallization temperature of said solute from said solution to the temperature of incipient crystallization of the major ingredient without substantial agitation of the solution, and thereupon increasing the crystallization velocity by incorporating into the solution an additional minor quantity of said major ingredient of a mesh size lower than 250, whereby crystallization takes place with production of compound seasoning crystals of said major ingredient having incorporated therein an effective flavor-enhancing minor proportion of said minor ingredient.

2. A method according to claim 1, wherein the major ingredient is monosodium glutamate and the minor ingredient is di-sodium 5'-guanylate, the temperature of incipient crystallization is 69° C., and the additional minor quantity of said major ingredient has a mesh size lower than 250.

3. A method according to claim 1, wherein the major ingredient is monosodium glutamate and the minor ingredient is di-sodium 5'-inosinate, the temperature of incipient crystallization is 69° C., and the additional minor quantity of said major ingredient has a mesh size lower than 250.

4. A method according to claim 1, wherein the major ingredient is monosodium glutamate and the minor ingredient is mono-sodium aspartate, the temperature of incipient crystallization is 69° C., and the additional minor quantity of said major ingredient has a mesh size lower than 250.

5. A compound seasoning consisting essentially of crystalline mono-sodium glutamate, having incorporated in the crystals thereof, as secondary seasoning, an effective flavor-enhancing minor proportion of a member selected from the group consisting of di-sodium, 5'-guanylate, di-sodium 5'-inosinate and mono-sodium aspartate.

6. A compound seasoning according to claim 5, wherein the first-named member is mono-sodium glutamate and the secondary seasoning is di-sodium 5'-guanylate.

7. A compound seasoning according to claim 5, wherein the first named member is mono-sodium glutamate and the secondary seasoning is di-sodium 5'-inosinate.

8. A compound seasoning according to claim 5, wherein the first-named member is mono-sodium glutamate and the secondary seasoning is mono-sodium aspartate.

9. A seasoning consisting essentially of crystalline mono-sodium glutamate having incorporated in the crystals thereof an effective flavor-enhancing minor proportion of a member selected from the group consisting of di-sodium 5'-guanylate and di-sodium 5'-inosinate.

References Cited

UNITED STATES PATENTS

| | | | |
|---|---|---|---|
| 1,035,591 | 8/1912 | Ikeda et al. | 99—16 |
| 1,950,459 | 3/1934 | Seifert | 99—143X |
| 2,584,731 | 2/1952 | Ogawa | 99—16 |
| 2,868,654 | 1/1959 | Haynes | 99—143 |
| 3,104,171 | 9/1963 | Sakaguchi et al. | 99—140N |
| 3,157,636 | 11/1964 | Sanno et al. | 195—28N |
| 3,190,877 | 6/1965 | Ishibashi et al. | 195—28N |

ALVIN E. TANENHOLTZ, Primary Examiner

U.S. Cl. X.R.

99—143